(12) United States Patent
Wu (10) Patent No.: US 12,478,641 B1
(45) Date of Patent: Nov. 25, 2025

(54) SILVER COMPOUND PREPARATION AND APPLICATION OF QUANTUM SILVER COMPOUND PREPARATION IN TREATMENT OF CUTANEOUS FUNGAL INFECTIONS AND ECZEMA

(71) Applicant: FLOURISHING INC, Memphis, TN (US)

(72) Inventor: Hongyun Wu, Guangzhou (CN)

(73) Assignee: FLOURISHING INC., Memphis, TN (US)

( * ) Notice: Subject to any disclaimer, the term of this patent is extended or adjusted under 35 U.S.C. 154(b) by 0 days.

(21) Appl. No.: 19/059,879

(22) Filed: Feb. 21, 2025

(51) Int. Cl.
| | |
|---|---|
| A61K 33/38 | (2006.01) |
| A61K 9/14 | (2006.01) |
| A61K 36/185 | (2006.01) |
| A61K 36/21 | (2006.01) |
| A61K 36/752 | (2006.01) |
| A61K 36/8962 | (2006.01) |
| A61P 31/10 | (2006.01) |
| A61P 17/00 | (2006.01) |

(52) U.S. Cl.
CPC .............. *A61K 33/38* (2013.01); *A61K 9/14* (2013.01); *A61K 36/185* (2013.01); *A61K 36/21* (2013.01); *A61K 36/752* (2013.01); *A61K 36/8962* (2013.01); *A61P 31/10* (2018.01); *A61K 2236/15* (2013.01); *A61K 2236/331* (2013.01); *A61K 2236/333* (2013.01); *A61K 2236/55* (2013.01); *A61P 17/00* (2018.01)

(58) Field of Classification Search
None
See application file for complete search history.

(56) References Cited

U.S. PATENT DOCUMENTS

2009/0269394 A1* 10/2009 Baker, Jr. ............... A61K 47/44
514/274

FOREIGN PATENT DOCUMENTS

| CN | 108392598 A | * | 8/2018 | ........... A61K 36/185 |
| WO | WO-2006109898 A1 | * | 10/2006 | ............. A61P 31/10 |

OTHER PUBLICATIONS

Quantum.Silver, Not all silver is equal: why nano silver beats colloidal silver every time-old technology vs new quantum technology (May 15, 2024), available at https://www.q-health.co.za/post/not-all-silver-is-equal, accessed on Jun. 2, 2025. (Year: 2024).*
Carter, E., A Comprehensive Guide to Quantum Silver, What is Quantum Silver? Feb. 26, 2025, available at https://puainta.com/blogs/medications/a-comprehensive-guide-to-quantum-silver, accessed on Jun. 2, 2025 (Year: 2025).*
Ichikawa, M., et al., Identification of Six Phenylpropanoids from Garlic Skin as Major Antioxidants, Journal of Agricultural and Food Chemistry 2003 51 (25), 7313-7317 (Year: 2003).*
Bergman, M. et al., The antioxidant activity of aqueous spinach extract: chemical identification of active fractions, Phytochemistry 58 (2001) 143-152 (Year: 2001).*
Machine translation of CN 108392598 A (Year: 2025).*

* cited by examiner

*Primary Examiner* — H. Sarah Park
(74) *Attorney, Agent, or Firm* — Ming Jiang; OPENPTO US LLC (57) ABSTRACT

The present application belongs to the field of preparation of compound preparations, and specifically, relates to a quantum silver compound preparation. Quantum silver nanoparticles prepared in the present application have a large surface area-to-volume ratio, and thus have high reactivity. Furthermore, the quantum silver nanoparticles have high antibacterial activity, and can destroy cell walls of bacteria and interfere with the metabolism of microorganisms. In the present application, advantages of preparation of a quantum silver compound preparation from nanocapsules containing quantum silver nanoparticles are as follows: quantum silver is encapsulated in the nanocapsules, so that silver ions can be released slowly. Consequently, the duration of the antibacterial effect is prolonged, and the frequency of administration is reduced. Through the nanocapsules, quantum silver can be precisely delivered to a body site to be treated or delivered into cells, to increase the local concentration and reduce systemic side effects.

8 Claims, 1 Drawing Sheet

SILVER COMPOUND PREPARATION AND APPLICATION OF QUANTUM SILVER COMPOUND PREPARATION IN TREATMENT OF CUTANEOUS FUNGAL INFECTIONS AND ECZEMA

TECHNICAL FIELD

The present application belongs to the field of preparation of compound preparations, and specifically, relates to a silver compound preparation, and particularly, to preparation of a silver compound preparation and application of the silver compound preparation in treatment of cutaneous fungal infections and eczema.

BACKGROUND

Cutaneous fungal infections are skin diseases caused by various types of fungi, including yeasts, molds, and other filamentous fungi. These fungi can grow and reproduce in warm and moist sites of the human body, such as the skin between the toes, the groin, and the scalp. Common types of cutaneous fungal infections include tinea pedis (athlete's foot) which usually occurs on the skin between the toes and has symptoms such as itching, peeling, cracks and blisters; tinea corporis, which affects non-hairy areas of the body, such as the trunk or limbs, and appears as round or oval red patches with slightly raised edges; tinea cruris, which mainly occurs on the inner thighs, buttocks, and around the genitals and is characterized by well-defined red spots with itching; tinea capitis, which is an infection of the scalp and may cause hair loss, scales, and pustules; and candidiasis, which is caused by yeasts of the genus *Candida*, commonly occurs in the mouth, vagina, and folds of the body (such as the armpits and the skin under the breasts), and may appear as white spots or redness and swelling with pain or itching. Risk factors for fungal skin infections include: a high humidity environment, that is caused by, for example, sweat retention or non-breathable shoes and socks. Cutaneous fungal infections seriously affect daily life of people. Eczema, also known as atopic dermatitis (AD), is a common chronic and recurrent inflammatory skin disease. It usually presents with symptoms such as dry skin, itching, red spots, and papules, which may progress to oozing and crusting. The exact cause of eczema remains unclear, but it is generally believed to be associated with genetic predisposition, immune system abnormalities, and environmental factors. Common symptoms of eczema include: itching, which is one of the most prominent symptoms of eczema and often causes patients to scratch, to further aggravate skin damage; red spot, which are red or pink patches on the skin; papules and vesicles, which are small, firm bumps that sometimes form fluid-filled blisters; scales, which refers to dry and flaky skin; skin cracks and thickening (lichenification), which may be caused by chronic eczema; and changes in pigmentation, which may leave a darker or lighter spot after healing. Common types of eczema include: acute eczema, which usually develops suddenly, with obvious redness and swelling, exudation, and blisters. Subacute eczema: it is an intermediate stage of acute eczema, which appears as that the redness and swelling are reduced but still exist, there is slight exudation, and scales begin to appear; and chronic eczema: it recurs over a long period of time, resulting in rough, thickened, and darkened skin often accompanied by severe itching. A treatment target of eczema is to relieve symptoms, control inflammation, prevent infection, and improve quality of life. Cutaneous fungal infections and eczema are both caused by pathogens infecting the skin. Current treatment methods mainly include moisturizing care, topical medical therapy, oral drugs, phototherapy, and the like. Due to the diversity of pathogens involved, ordinary topical or oral medications only provide a symptomatic relief rather than a complete cure. In view of this, development of a compound preparation for rapidly treating cutaneous fungal infections and eczema is of great significance for guarantee of people's health.

silver is mainly used for treating cutaneous infections and other symptoms, and can relieve periodontitis, gingival bleeding, and the like when administered orally. Ordinary antibiotics are effective against 6 types of pathogens, but silver can kill 650 different pathogens. silver can effectively kill a variety of bacteria, fungi, yeasts, viruses, mycoplasmas, chlamydia, parasites, and the like. Therefore, the present application has developed a compound preparation that is prepared from a herbal extract and silver and is used for treating cutaneous fungal infections and eczema.

SUMMARY

In order to overcome the deficiencies in the prior art, an objective of the present application is to provide a silver compound preparation, and specifically, preparation of a silver compound preparation and application of the silver compound preparation in treatment of cutaneous fungal infections and eczema. The objective is achieved by the following technical solutions.

S1: preparing a herbal extract by steam distillation extraction: weighing 143-198 g of *Portulaca oleracea,* 189-232 g of *Plumbagella micrantha* (Ledeb.) Spach, 53-66 g of peel of *Allium sativum,* 50-66 g of roots of *Spinacia oleracea*, and 28-35 g of peel of *Citrus reticulata*, grinding, adding water to cover the materials, pre-treating by using an ultrasonic machine for 15-20 min, adding 2-4 L of deionized water, heating and maintaining the system in a boiling state, quickly adding 130-150 mL of cider vinegar, and performing reflux condensation to obtain a required herbal extract of the present application. In this step, ultrasonic pre-treatment helps to break down cell walls of herbs and dissolve out active ingredients The addition of cider vinegar helps reflux condensation. In addition, a pH value of cider vinegar is close to that of the human skin, and thus cider vinegar is a natural ingredient for maintaining the pH value of the skin.

S2: adding 33-55 mL of 0.1 M CsOH to 265-286 mL of 1.5-3.2 mM hydroxylammonium chloride ($NH_2OH \cdot HCl$) solution, adding 55.5-76.8 mL of 11-13 mM $AgNO_3$ solution, adding 1.5-2.8 g of sodium dodecyl sulfate, uniformly stirring, performing ultrasonic treatment at 42-54° C. for 33-55 min, placing the solution for 5-8 h, centrifuging at 8,000 rpm, to obtain spherical silver nanoparticles, uniformly mixing the silver nanoparticles with 11-13 g of chitosan, performing vacuum ball milling in a ball mill for 8-11 h, heating in an ultrafast high-temperature Joule heating furnace, uniformly spreading the ball-milled powder containing the spherical silver nanoparticles on conductive substrate graphite paper with a powder layer thickness of 0.8-1.2 mm, setting an initial current density to 200-300 $A/cm^2$, setting a heating rate to $10^6$ K/s, setting a target temperature to 550-630° C., turning on the power, instantly raising the temperature to the target temperature through Joule effect, maintaining the temperature for 40-60 s, taking high-pressure helium as a cooling medium, after heat preservation is completed, immediately turning off the power, and introducing high-pressure helium for quenching, to obtain silver nanoparticles. In this step, $NH_2OH \cdot HCl$ is taken as a reductant, which can not only reduce silver ions into silver nanoparticles, but also play the role of a stabilizer to some extent, avoiding aggregation of particles. A reaction mechanism is as follows: $Ag^+ + NH_2OH \cdot HCl \rightarrow Ag$ (nanoparticles)$+N_2O+H_2O+HCl$. By virtue of the rapid temperature raising characteristics of the specially-made ultrafast high-temperature Joule heating furnace, pure silver nanoparticles are quickly prepared. In this step, the ball-milled silver nanoparticles have a large surface area-to-volume ratio, and thus has high reactivity. In this step, when dissolved in water, sodium dodecyl sulfate dissociates to produce negatively charged dodecyl sulfate ions ($C_{12}H_{25}SO^{4-}$), which reduce the surface tension of water and promote the rapid aggregation of Ag ions to form nanoparticles.

S3: preparing nanocapsules: weighing 225-235 mL of glycerol, 13.5-17.2 g of gelatin particles, and 12-15 mL of glycol, uniformly mixing by ultrasonic stirring, adding 65-72 mL of deionized water, 1.2-1.6 g of polyethylene glycol 8000, 11.8-13.2 g of silver nanoparticles prepared in step S2, and 3-5 g of collagen, uniformly stirring, transferring into a three-neck flask, mounting a stirrer, stirring for 50 min, adding cider vinegar to adjust a pH value to 5-6, reacting at 300-400 rpm for 5-6 h, placing for precipitation, removing an upper solvent, washing with distilled water or 75% medicinal alcohol, and vacuum drying for 12 h, to obtain solid powder, namely, nanocapsules containing the silver particles. Advantages of preparation of a silver compound preparation from the nanocapsules containing the silver particles prepared in this step are as follows: silver is encapsulated in the nanocapsules, so that silver ions can be released slowly. Consequently, the duration of the antibacterial effect is prolonged, and the frequency of administration is reduced. Through the nanocapsules, silver can be precisely delivered to a body site to be treated or delivered into cells, to increase the local concentration and reduce systemic side effects. In addition to silver, the nanocapsules are loaded with collagen, which can maintain the skin firmness and elasticity, promote wound healing, and help repair damaged cartilage tissue.

S4: adding 10.6-13.8 g of nanocapsules containing the silver nanoparticles that are prepared in step S3 and 1.2-1.5 g of lidocaine to 120-150 mL of herbal extract prepared in step S1, uniformly stirring, performing ultrasonic treatment for 15-20 min, placing in a vacuum mixing and homogenizing machine, adding 6-8 g of sodium carboxymethylcellulose (CMC) and 35-60 mL of glycerin to the vacuum mixing and homogenizing machine, mixing and stirring for 20-40 min, turning on a vacuum pump of the mixing and homogenizing machine to start vacuuming, vacuum stirring for 45 min, filling paste into a soft tube, and sealing by using a tube sealing machine, to obtain a silver compound preparation. In this step, addition of glycerin can maintain certain wettability and soft fluidity of the paste. In this step, sodium CMC is a water-soluble cellulose derivative, which can improve viscosity of the silver compound preparation and improve the texture. In this step, the small amount of lidocaine added is an amide local anesthetic, which achieves the anesthetic effect by blocking the generation and conduction of nerve impulses during use, to relieve or eliminate pain. In this step, the used herbal extract contains the roots of S. oleracea and the peel of C. reticulata that are rich in antioxidant ingredients. Introduction of the roots of S. oleracea and the peel of C. reticulata into the herbal extract is beneficial to preventing the silver compound preparation of the present application from being rapidly oxidized, and prolonging the duration of the medicinal effect on the skin.

Preferably, in step S1, the herbal extract is prepared by steam distillation extraction: 143 g of P. oleracea, 189 g of P. micrantha (Ledeb.) Spach, 53 g of peel of A. sativum, 50 g of roots of S. oleracea, and 28 g of peel of C. reticulata are weighed and ground, water is added to cover the materials, the mixer is pre-treated by using the ultrasonic machine for 15 min, 2 L of deionized water is added, the system is heated and maintained in the boiling state, 130 mL of cider vinegar is quickly added, and reflux condensation is performed to obtain the required herbal extract of the present application.

Preferably, in step S1, the herbal extract is prepared by steam distillation extraction: 198 g of P. oleracea, 232 g of P. micrantha (Ledeb.) Spach, 66 g of peel of A. sativum, 66 g of roots of S. oleracea, and 35 g of peel of C. reticulata are weighed and ground, water is added to cover the materials, the mixer is pre-treated by using the ultrasonic machine for 20 min, 4 L of deionized water is added, the system is heated and maintained in the boiling state, 150 mL of cider vinegar is quickly added, and reflux condensation is performed to obtain the required herbal extract of the present application.

Preferably, in step S2, 33 mL of 0.1 M CsOH is added to 265 mL of 1.5 mM $NH_2OH \cdot HCl$ solution, 55.5 mL of 13 mM $AgNO_3$ solution is added, 1.5 g of sodium dodecyl sulfate is added, the materials are uniformly stirred and subjected to ultrasonic treatment at 42° C. for 33 min, the solution is placed for 5 h and centrifuged at 8,000 rpm, to obtain the spherical silver nanoparticles, the silver nanoparticles are uniformly mixed with 11 g of chitosan, the mixer is subjected to vacuum ball milling in the ball mill for 8 h and heated in the ultrafast high-temperature Joule heating furnace, the ball-milled powder containing the spherical silver nanoparticles is uniformly spread on the conductive substrate graphite paper with the powder layer thickness of 0.8 mm, the initial current density is set to 200 A/cm², the heating rate is set to $10^6$ K/s, the target temperature is set to 550° C., the power is turned on, the temperature is instantly raised to the target temperature through Joule effect, the temperature is maintained for 40 s, high-pressure helium is taken as the cooling medium, after heat preservation is completed, the power is immediately turned off, and high-pressure helium is introduced for quenching, to obtain the silver nanoparticles.

Preferably, in step S2, 55 mL of 0.1 M CsOH is added to 286 mL of 3.2 mM $NH_2OH \cdot HCl$ solution, 76.8 mL of 13 mM $AgNO_3$ solution is added, 2.8 g of sodium dodecyl sulfate is added, the materials are uniformly stirred and subjected to ultrasonic treatment at 54° C. for 55 min, the solution is placed for 8 h and centrifuged at 8,000 rpm, to obtain the spherical silver nanoparticles, the silver nanoparticles are uniformly mixed with 13 g of chitosan, the mixer is subjected to vacuum ball milling in the ball mill for 11 h and heated in the ultrafast high-temperature Joule heating furnace, the ball-milled powder containing the spherical silver nanoparticles is uniformly spread on the conductive substrate graphite paper with the powder layer thickness of 1.2 mm, the initial current density is set to 300 A/cm², the heating rate is set to $10^6$ K/s, the target temperature is set to 630° C., the power is turned on, the temperature is instantly raised to the target temperature through Joule effect, the temperature is maintained for 60 s, high-pressure helium is taken as the cooling medium, after heat preservation is completed, the power is immediately turned off, and high-pressure helium is introduced for quenching, to obtain the silver nanoparticles.

Preferably, in step S3, 225 mL of glycerol, 13.5 g of gelatin particles, and 12 mL of glycol are weighed and uniformly mixed by ultrasonic stirring, 65 mL of deionized water, 1.2 g of polyethylene glycol 8000, 11.8 g of silver nanoparticles prepared in step S2, and 3 g of collagen are added, the materials are uniformly stirred and transferred into the three-neck flask, the stirrer is mounted, the mixture is stirred for 50 min, cider vinegar is added to adjust the pH value to 5, the solution reacts at 300 rpm for 5 h and is placed for precipitation, the upper solvent is removed, and the precipitates are washed with distilled water or 75% medicinal alcohol and vacuum dried for 12 h, to obtain the solid powder, namely, the nanocapsules containing the silver particles.

Preferably, in step S3, 235 mL of glycerol, 17.2 g of gelatin particles, and 15 mL of glycol are weighed and uniformly mixed by ultrasonic stirring, 72 mL of deionized water, 1.6 g of polyethylene glycol 8000, 13.2 g of silver nanoparticles prepared in step S2, and 5 g of collagen are added, the materials are uniformly stirred and transferred into the three-neck flask, the stirrer is mounted, the mixture is stirred for 50 min, cider vinegar is added to adjust the pH value to 6, the solution reacts at 400 rpm for 5 h and is placed for precipitation, the upper solvent is removed, and the precipitates are washed with distilled water or 75% medicinal alcohol and vacuum dried for 12 h, to obtain the solid powder, namely, the nanocapsules containing the silver particles.

Preferably, in step S4, 10.6 g of nanocapsules containing the silver particles that are prepared in step S3 and 1.2 g of lidocaine are added to 120 mL of herbal extract prepared in step S1, the materials are uniformly stirred and subjected to ultrasonic treatment for 15 min, the mixture is placed in the vacuum mixing and homogenizing machine, 6 g of sodium CMC and 35 mL of glycerin are added to the vacuum mixing and homogenizing machine, the materials are mixed and stirred for 20 min, the vacuum pump of the mixing and homogenizing machine is turned on to start vacuuming, the materials are vacuum stirred for 45 min, paste is filled into the soft tube, and the soft tube is sealed by using the tube sealing machine, to obtain the silver compound preparation.

Preferably, in step S4, 13.8 g of nanocapsules containing the silver particles that are prepared in step S3 and 1.5 g of lidocaine are added to 150 mL of herbal extract prepared in step S1, the materials are uniformly stirred and subjected to ultrasonic treatment for 20 min, the mixture is placed in the vacuum mixing and homogenizing machine, 8 g of sodium CMC and 60 mL of glycerin are added to the vacuum mixing and homogenizing machine, the materials are mixed and stirred for 40 min, the vacuum pump of the mixing and homogenizing machine is turned on to start vacuuming, the materials are vacuum stirred for 45 min, paste is filled into the soft tube, and the soft tube is sealed by using the tube scaling machine, to obtain the silver compound preparation.

The present application has the following beneficial effects:
1. The silver nanoparticles of the present application have a large surface area-to-volume ratio, and thus have high reactivity.
2. The silver nanoparticles of the present application have high antibacterial activity, and can destroy cell walls of bacteria and interfere with the metabolism of microorganisms.
3. In the present application, during preparation of the herbal extract, ultrasonic pre-treatment is adopted to break down cell walls of the herbs and dissolve out active ingredients.
4. In the present application, advantages of preparation of the silver compound preparation from the nanocapsules containing the silver particles are as follows: silver is encapsulated in the nanocapsules, so that silver ions can be released slowly. Consequently, the duration of the antibacterial effect is prolonged, and the frequency of administration is reduced. Through the nanocapsules, silver can be precisely delivered to a body site to be treated or delivered into cells, to increase the local concentration and reduce systemic side effects. In addition to silver, the nanocapsules are loaded with collagen, which can maintain the skin firmness and elasticity, promote wound healing, and help repair damaged cartilage tissue.
5. The herbal extract used in the present application contains the roots of *S. oleracea* and the peel of *C. reticulata* that are rich in antioxidant ingredients. Introduction of the roots of *S. oleracea* and the peel of *C. reticulata* into the herbal extract is beneficial to preventing the silver compound preparation of the present application from being rapidly oxidized, and prolonging the duration of the medicinal effect on the skin.
6. The present application is easy to operate and has low production costs, and thus is suitable for mass production.

DETAILED DESCRIPTION OF PREFERRED EMBODIMENTS

The implementations of the present application are described below with reference to specific examples. Those skilled in the art can easily understand other advantages and effects of the present application from the contents disclosed in the description. The present application may be implemented or applied through other different specific implementations, and the details in the description may be modified or changed in various ways based on different viewpoints and applications without departing from the spirit of the present application. It should be noted that the following embodiments and features therein may be combined with each other if there is no conflict.

Example 1

S1: a herbal extract was prepared by steam distillation extraction: 143 g of *Portulaca oleracea,* 189 g of *Plumbagella micrantha* (Ledeb.) Spach, 53-66 g of peel of *Allium sativum,* 50 g of roots of *Spinacia oleracea*, and 28 g of peel of *Citrus reticulata* were weighed and ground, water was added to cover the materials, the mixer was pre-treated by using an ultrasonic machine for 15 min, 2 L of deionized water was added, the system was heated and maintained in a boiling state, 130 mL of cider vinegar was quickly added, and reflux condensation was performed to obtain a required herbal extract of the present application. In this step, ultrasonic treatment was adopted to break down cell walls of the herbs and dissolve out active ingredients. The addition of cider vinegar helped reflux condensation. In addition, a pH value of cider vinegar was close to that of the human skin, and thus cider vinegar was a natural ingredient for maintaining the pH value of the skin.

S2: 33 mL of 0.1 M CsOH was added to 265 mL of 1.5 mM hydroxylammonium chloride ($NH_2OH \cdot HCl$) solution, 55.5 mL of 11 mM $AgNO_3$ solution was added, 1.5 g of sodium dodecyl sulfate was added, the materials were uniformly stirred and subjected to ultrasonic treatment at 42° C. for 33 min, the solution was placed for 5 h and centrifuged at 8,000 rpm, to obtain spherical silver nanoparticles, the silver nanoparticles were uniformly mixed with 11 g of chitosan, the mixer was subjected to vacuum ball milling in a ball mill for 8 h and heated in an ultrafast high-temperature Joule heating furnace, the ball-milled powder containing the spherical silver nanoparticles was uniformly spread on conductive substrate graphite paper with a powder layer thickness of 0.8 mm, an initial current density was set to 200 $A/cm^2$, the heating rate was set to $10^6$ K/s, the target temperature was set to 550° C., the power was turned on, the temperature was instantly raised to the target temperature through Joule effect, the temperature was maintained for 40 s, high-pressure helium was taken as a cooling medium, after heat preservation was completed, the power was immediately turned off, and high-pressure helium was introduced for quenching, to obtain silver nanoparticles. In this step, $NH_2OH \cdot HCl$ was taken as a reductant, which could not only reduce silver ions into silver nanoparticles, but also play the role of a stabilizer to some extent, avoiding aggregation of particles. A reaction mechanism was as follows: $Ag^+$+ $NH_2OH \cdot HCl \rightarrow Ag$ (nanoparticles)+$N_2O$+$H_2O$+$HCl$. By virtue of the rapid temperature raising characteristics of the specially-made ultrafast high-temperature Joule heating furnace, pure silver nanoparticles were quickly prepared. In this step, the ball-milled silver nanoparticles had a large surface area-to-volume ratio, and thus had high reactivity. In this step, when dissolved in water, sodium dodecyl sulfate dissociated to produce negatively charged dodecyl sulfate ions ($C_{12}H_{25}SO_4^-$), which reduced the surface tension of water and promoted the rapid aggregation of Ag ions to form nanoparticles.

S3: nanocapsules were prepared: 225 mL of glycerol, 13.5 g of gelatin particles, and 12 mL of glycol were weighed and uniformly mixed by ultrasonic stirring, 65 mL of deionized water, 1.2 g of polyethylene glycol 8000, 11.8 g of silver nanoparticles prepared in step S2, and 3 g of collagen were added, the materials were uniformly stirred and transferred into a three-neck flask, a stirrer was mounted, the mixture was stirred for 50 min, cider vinegar was added to adjust a pH value to 5, the solution reacted at 300 rpm for 5 h and was placed for precipitation, an upper solvent was removed, and precipitates were washed with distilled water or 75% medicinal alcohol and vacuum dried for 12 h, to obtain solid powder, namely, nanocapsules containing the silver particles. Advantages of preparation of a silver compound preparation from the nanocapsules containing the silver particles prepared in this step were as follows: silver was encapsulated in the nanocapsules, so that silver ions could be released slowly. Consequently, the duration of the antibacterial effect was prolonged, and the frequency of administration was reduced. Through the nanocapsules, silver could be precisely delivered to a body site to be treated or delivered into cells, to increase the local concentration and reduce systemic side effects. In addition to silver, the nanocapsules were loaded with collagen, which could maintain the skin firmness and elasticity, promoted wound healing, and helped repair damaged cartilage tissue.

S4: 10.6 g of nanocapsules containing the silver particles that were prepared in step S3 and 1.2 g of lidocaine were added to 120 mL of herbal extract prepared in step S1, the materials were uniformly stirred and subjected to ultrasonic treatment for 15 min, the mixture was placed in a vacuum mixing and homogenizing machine, 6 g of sodium carboxymethylcellulose (CMC) and 35-60 mL of glycerin were added to the vacuum mixing and homogenizing machine, the materials were mixed and stirred for 20 min, a vacuum pump of the mixing and homogenizing machine was turned on to start vacuuming, the materials were vacuum stirred for 45 min, paste was filled into a soft tube, and the soft tube was sealed by using a tube sealing machine, to obtain a silver compound preparation. In this step, addition of glycerin could maintain certain wettability and soft fluidity of the paste. In this step, sodium CMC was a water-soluble cellulose derivative, which could improve viscosity of the silver compound preparation and improve the texture. In this step, the small amount of lidocaine added was an amide local anesthetic, which achieved the anesthetic effect by blocking the generation and conduction of nerve impulses during use, to relieve or eliminate pain. In this step, the used herbal extract contained the roots of *S. oleracea* and the peel of *C. reticulata* that were rich in antioxidant ingredients. Introduction of the roots of *S. oleracea* and the peel of *C. reticulata* into the herbal extract was beneficial to preventing the silver compound preparation of the present application from being rapidly oxidized, and prolonging the duration of the medicinal effect on the skin.

Figure 1:
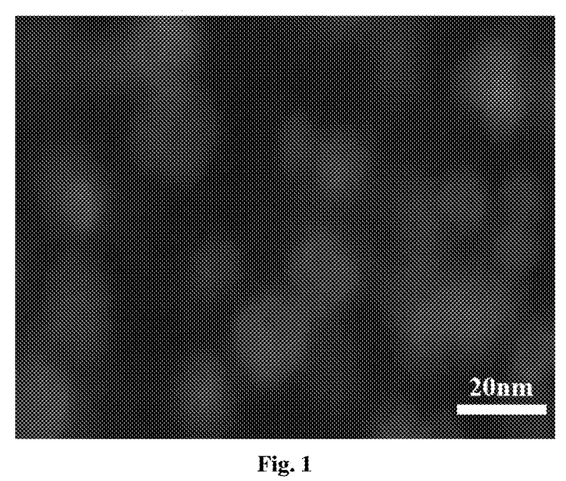
FIG. 1 is a transmission electron microscopy (TEM) image of silver nanoparticles prepared in Example 1 of the present application.
Figure 2:
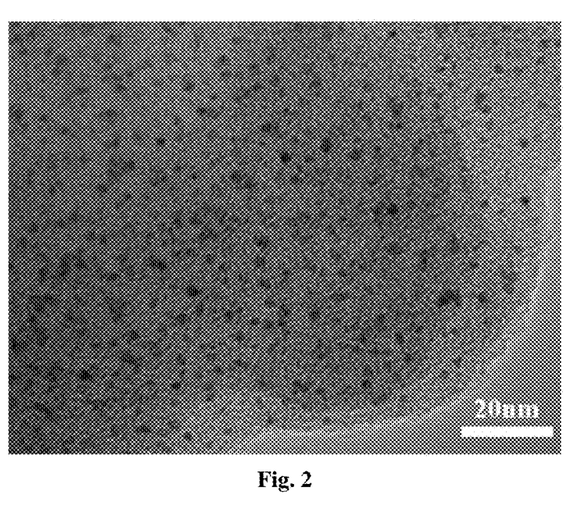
FIG. 2 is a TEM image of silver nanoparticles prepared in Example 1 of the present application.

FIG. 1 is a transmission electron microscopy (TEM) image of the silver nanoparticles prepared in Example 1 of the present application; and FIG. 2 is a TEM image of the silver nanoparticles prepared in Example 1 of the present application. It can be seen from the figures that the silver nanoparticles quickly prepared by virtue of the rapid temperature raising characteristics of the Joule heating furnace have a much smaller size compared with the silver nanoparticles. The small-sized silver nanoparticles have many unique advantages. Due to the confinement effect, the proportion of surface atoms of the small-sized silver nanoparticles is relatively high, which allows more silver ions to participate in the reaction, thereby improving the antibacterial efficiency of the compound preparation. Silver ions themselves have good antibacterial properties, and the silver nanoparticles, due to their high surface energy and small size effect, can release silver ions more effectively, enhance their ability to penetrate cell walls of bacteria, and provide a stronger antibacterial effect. In addition, the silver nanoparticles can serve as a carrier in a drug delivery system. Their small size and surface modification capability help improve drug selectivity and efficacy and reduce side effects. $NH_2OH \cdot HCl$ is taken as a reductant, which can not only reduce silver ions into silver nanoparticles, but also play the role of a stabilizer to some extent, avoiding aggregation of particles.

Example 2

S1: a herbal extract was prepared by steam distillation extraction: 198 g of *P. oleracea,* 232 g of *P. micrantha* (Ledeb.) Spach, 66 g of peel of *A. sativum,* 66 g of roots of *S. oleracea*, and 35 g of peel of *C. reticulata* were weighed and ground, water was added to cover the materials, the mixer was pre-treated by using an ultrasonic machine for 20 min, 4 L of deionized water was added, the system was heated and maintained in a boiling state, 150 mL of cider vinegar was quickly added, and reflux condensation was performed to obtain a required herbal extract of the present application. In this step, ultrasonic treatment was adopted to break down cell walls of the herbs and dissolve out active ingredients. The addition of cider vinegar helped reflux condensation. In addition, a pH value of cider vinegar was close to that of the human skin, and thus cider vinegar was a natural ingredient for maintaining the pH value of the skin.

S2: 55 mL of 0.1 M CsOH was added to 286 mL of 3.2 mM $NH_2OH·HCl$ solution, 76.8 mL of 13 mM $AgNO_3$ solution was added, 2.8 g of sodium dodecyl sulfate was added, the materials were uniformly stirred and subjected to ultrasonic treatment at 54° C. for 55 min, the solution was placed for 8 h and centrifuged at 8,000 rpm, to obtain spherical silver nanoparticles, the silver nanoparticles were uniformly mixed with 13 g of chitosan, the mixer was subjected to vacuum ball milling in a ball mill for 11 h and heated in an ultrafast high-temperature Joule heating furnace, the ball-milled powder containing the spherical silver nanoparticles was uniformly spread on conductive substrate graphite paper with a powder layer thickness of 1.2 mm, an initial current density was set to 300 $A/cm^2$, the heating rate was set to $10^6$ K/s, the target temperature was set to 630° C., the power was turned on, the temperature was instantly raised to the target temperature through Joule effect, the temperature was maintained for 60 s, high-pressure helium was taken as a cooling medium, after heat preservation was completed, the power was immediately turned off, and high-pressure helium was introduced for quenching, to obtain silver nanoparticles. In this step, $NH_2OH·HCl$ was taken as a reductant, which could not only reduce silver ions into silver nanoparticles, but also play the role of a stabilizer to some extent, avoiding aggregation of particles. A reaction mechanism was as follows: $Ag^+ + NH_2OH·HCl \rightarrow Ag$ (nanoparticles)$+N_2O+H_2O+HCl$. By virtue of the rapid temperature raising characteristics of the specially-made ultrafast high-temperature Joule heating furnace, pure silver nanoparticles were quickly prepared. In this step, the ball-milled silver nanoparticles had a large surface area-to-volume ratio, and thus had high reactivity. In this step, when dissolved in water, sodium dodecyl sulfate dissociated to produce negatively charged dodecyl sulfate ions ($C_{12}H_{25}SO^{4-}$), which reduced the surface tension of water and promoted the rapid aggregation of Ag ions to form nanoparticles.

S3: nanocapsules were prepared: 235 mL of glycerol, 17.2 g of gelatin particles, and 15 mL of glycol were weighed and uniformly mixed by ultrasonic stirring, 72 mL of deionized water, 1.6 g of polyethylene glycol 8000, 13.2 g of silver nanoparticles prepared in step S2, and 5 g of collagen were added, the materials were uniformly stirred and transferred into a three-neck flask, a stirrer was mounted, the mixture was stirred for 50 min, cider vinegar was added to adjust a pH value to 6, the solution reacted at 400 rpm for 6 h and was placed for precipitation, an upper solvent was removed, and precipitates were washed with distilled water or 75% medicinal alcohol and vacuum dried for 12 h, to obtain solid powder, namely, nanocapsules containing the silver particles. Advantages of preparation of a silver compound preparation from the nanocapsules containing the silver particles prepared in this step were as follows: silver was encapsulated in the nanocapsules, so that silver ions could be released slowly. Consequently, the duration of the antibacterial effect was prolonged, and the frequency of administration was reduced. Through the nanocapsules, silver could be precisely delivered to a body site to be treated or delivered into cells, to increase the local concentration and reduce systemic side effects. In addition to silver, the nanocapsules were loaded with collagen, which could maintain the skin firmness and elasticity, promoted wound healing, and helped repair damaged cartilage tissue.

S4: 13.8 g of nanocapsules containing the silver particles that were prepared in step S3 and 1.5 g of lidocaine were added to 150 mL of herbal extract prepared in step S1, the materials were uniformly stirred and subjected to ultrasonic treatment for 20 min, the mixture was placed in a vacuum mixing and homogenizing machine, 8 g of sodium CMC and 60 mL of glycerin were added to the vacuum mixing and homogenizing machine, the materials were mixed and stirred for 40 min, a vacuum pump of the mixing and homogenizing machine was turned on to start vacuuming, the materials were vacuum stirred for 45 min, paste was filled into a soft tube, and the soft tube was sealed by using a tube sealing machine, to obtain a silver compound preparation. In this step, addition of glycerin could maintain certain wettability and soft fluidity of the paste. In this step, sodium CMC was a water-soluble cellulose derivative, which could improve viscosity of the silver compound preparation and improve the texture. In this step, the small amount of lidocaine added was an amide local anesthetic, which achieved the anesthetic effect by blocking the generation and conduction of nerve impulses during use, to relieve or eliminate pain. In this step, the used herbal extract contained the roots of *S. oleracea* and the peel of *C. reticulata* that were rich in antioxidant ingredients. Introduction of the roots of *S. oleracea* and the peel of *C. reticulata* into the herbal extract was beneficial to preventing the silver compound preparation of the present application from being rapidly oxidized, and prolonging the duration of the medicinal effect on the skin.

Comparative Example 1: a difference between this example and Example 2 was as follows: peel of *A. sativum* was not added in step S1, and other steps were the same as those in Example 2.

Comparative Example 2: a difference between this example and Example 2 was as follows: cider vinegar was not added in step S1, and other steps were the same as those in Example 2.

Comparative Example 3: a difference between this example and Example 2 was as follows: roots of *S. oleracea* were not added in step S1, and other steps were the same as those in Example 2.

Comparative Example 4: a difference between this example and Example 2 was as follows: peel of *C. reticulata* was not added in step S1, and other steps were the same as those in Example 2.

Cutaneous fungal infections are common conditions caused by various fungi that thrive in warm and moist environments. Common fungi that cause cutaneous fungal infections include dermatophytes (including *Microsporum, Trichophyton*, and *Epidermophyton*), yeasts (such as *Candida*), and the like. Therefore, *Microsporum, Trichophyton, Epidermophyton*, and *Candida* are selected for detection of antibacterial activity of the silver compound preparation of the present application. All bacteria used in an experiment of the present application are purchased from China General Microbiological Culture Collection Center (CGMCC). The zone of inhibition test (also known as disk diffusion test) is a common method for detecting an inhibitory effect of an antibiotic or another antimicrobial substance on microbial growth. The basic principle of the zone of inhibition test is as follows: a disk containing an antibacterial agent is placed on the surface of a medium inoculated with a test microorganism, and after a period of culture, if the antibacterial agent has an inhibitory effect on the microorganism, a transparent area without the microorganism will be formed around the disk, which is the so-called "inhibition zone". A size of the inhibition zone can reflect the inhibitory effect of the antibacterial agent on the microorganism. A medium was prepared: a medium suitable for fungal growth was selected, such as Sabouraud Dextrose Agar, and uniformly spread in a petri dish. The to-be-tested fungus was uniformly coated onto the entire surface of the medium. A fungal suspension was picked up by using a sterile cotton swab and coated onto the surface of the medium. Small disks (generally with a diameter of 6 mm) prepared from sterile filter paper were soaked in a suspension of the compound preparation of the present application, to make sure that each disk contained approximately 15 μg of compound preparation. The disks were placed on the medium, to make sure that there is enough space between the disks to prevent the disks from affecting each other. The treated petri dish was cultured at a preference temperature (normally 25-28° C.) for 7 d. After culture was completed, a diameter of an inhibition zone around each disk was observed and measured. To avoid occasionality, each experimental was repeated 5 times.

TABLE 1

| | Inhibition zone size | | | |
|---|---|---|---|---|
| Type | *Microsporum* | *Trichophyton* | *Epidermophyton* | *Candida* |
| Example 1 | 12.5 ± 1.2 mm | 11.3 ± 0.8 mm | 13.2 ± 0.5 mm | 14.7 ± 1.1 mm |
| Example 2 | 11.4 ± 0.9 mm | 13.2 ± 1.0 mm | 12.8 ± 0.9 mm | 13.6 ± 1.1 mm |
| Comparative Example 1 | 10.5 ± 0.9 mm | 9.2 ± 1.2 mm | 10.1 ± 1.3 mm | 8.5 ± 0.8 mm |
| Comparative Example 2 | 10.3 ± 0.5 mm | 10.7 ± 0.6 mm | 9.6 ± 0.9 mm | 10.9 ± 1.1 mm |
| Comparative Example 3 | 9.8 ± 1.2 mm | 9.9 ± 1.1 mm | 11.3 ± 0.5 mm | 9.6 ± 0.9 mm |
| Comparative Example 4 | 9.3 ± 0.7 mm | 10.8 ± 0.5 mm | 9.6 ± 0.6 mm | 10.4 ± 0.5 mm |

A larger inhibition zone indicates a better inhibitory effect of the antibacterial agent on the fungus. It can be seen from Table 1 that compared with Comparative Example 1 to Comparative Example 4, the silver compound preparations of Example 1 and Example 2 achieve a better antibacterial effect. A pH value of cider vinegar is close to that of the human skin, and thus cider vinegar is a natural ingredient for maintaining the pH value of the skin and promotes absorption of the preparation by the skin. The peel of *A. sativum*, the roots of *S. oleracea*, and the peel of *C. reticulata* are rich in antioxidant ingredients. Introduction of these materials into the herbal extract is beneficial to preventing the silver compound preparation of the present application from being rapidly oxidized, and prolonging the duration of the medicinal effect on the skin. The ingredients in the herbal extract cooperate with each other, to promote the medicinal effect of the silver compound preparation on cutaneous fungal infections.

Example 3

S1: a herbal extract was prepared by steam distillation extraction: 178 g of *P. oleracea*, 199 g of *P. micrantha* (Ledeb.) Spach, 58 g of peel of *A. sativum*, 58 g of roots of *S. oleracea*, and 33 g of peel of *C. reticulata* were weighed and ground, water was added to cover the materials, the mixer was pre-treated by using an ultrasonic machine for 18 min, 3 L of deionized water was added, the system was heated and maintained in a boiling state, 130-150 mL of cider vinegar was quickly added, and reflux condensation was performed to obtain a required herbal extract of the present application. In this step, ultrasonic treatment was adopted to break down cell walls of the herbs and dissolve out active ingredients. The addition of cider vinegar helped reflux condensation. In addition, a pH value of cider vinegar was close to that of the human skin, and thus cider vinegar was a natural ingredient for maintaining the pH value of the skin.

S2: 39 mL of 0.1 M CsOH was added to 277 mL of 1.9 mM $NH_2OH \cdot HCl$ solution, 65.5 mL of 12 mM $AgNO_3$ solution was added, 1.9 g of sodium dodecyl sulfate was added, the materials were uniformly stirred and subjected to ultrasonic treatment at 50° C. for 35 min, the solution was placed for 6 h and centrifuged at 8,000 rpm, to obtain spherical silver nanoparticles, the silver nanoparticles were uniformly mixed with 12 g of chitosan, the mixer was subjected to vacuum ball milling in a ball mill for 9 h and heated in an ultrafast high-temperature Joule heating furnace, the ball-milled powder containing the spherical silver nanoparticles was uniformly spread on conductive substrate graphite paper with a powder layer thickness of 1.1 mm, an initial current density was set to 250 $A/cm^2$, the heating rate was set to $10^6$ K/s, the target temperature was set to 600° C., the power was turned on, the temperature was instantly raised to the target temperature through Joule effect, the temperature was maintained for 48 s, high-pressure helium was taken as a cooling medium, after heat preservation was completed, the power was immediately turned off, and high-pressure helium was introduced for quenching, to obtain silver nanoparticles. In this step, $NH_2OH \cdot HCl$ was taken as a reductant, which could not only reduce silver ions into silver nanoparticles, but also play the role of a stabilizer to some extent, avoiding aggregation of particles. A reaction mechanism was as follows: $Ag^+ + NH_2OH \cdot HCl \rightarrow Ag$ (nanoparticles)$+N_2O+H_2O+HCl$. By virtue of the rapid temperature raising characteristics of the specially-made ultrafast high-temperature Joule heating furnace, pure silver nanoparticles were quickly prepared. In this step, the ball-milled silver nanoparticles had a large surface area-to-volume ratio, and thus had high reactivity. In this step, when dissolved in water, sodium dodecyl sulfate dissociated to produce negatively charged dodecyl sulfate ions ($C_{12}H_{25}SO_4^-$), which reduced the surface tension of water and promoted the rapid aggregation of Ag ions to form nanoparticles.

S3: nanocapsules were prepared: 230 mL of glycerol, 16.2 g of gelatin particles, and 13 mL of glycol were weighed and uniformly mixed by ultrasonic stirring, 69 mL of deionized water, 1.4 g of polyethylene glycol 8000, 12.2 g of silver nanoparticles prepared in step S2, and 4 g of collagen were added, the materials were uniformly stirred and transferred into a three-neck flask, a stirrer was mounted, the mixture was stirred for 50 min, cider vinegar was added to adjust a pH value to 5.5, the solution reacted at 400 rpm for 5.5 h and was placed for precipitation, an upper solvent was removed, and precipitates were washed with distilled water or 75% medicinal alcohol and vacuum dried for 12 h, to obtain solid powder, namely, nanocapsules containing the silver particles. Advantages of preparation of a silver compound preparation from the nanocapsules containing the silver particles prepared in this step were as follows: silver was encapsulated in the nanocapsules, so that silver ions could be released slowly. Consequently, the duration of the antibacterial effect was prolonged, and the frequency of administration was reduced. Through the nanocapsules, silver could be precisely delivered to a body site to be treated or delivered into cells, to increase the local concentration and reduce systemic side effects. In addition to silver, the nanocapsules were loaded with collagen, which could maintain the skin firmness and elasticity, promoted wound healing, and helped repair damaged cartilage tissue.

S4: 12.8 g of nanocapsules containing the silver particles that were prepared in step S3 and 1.3 g of lidocaine were added to 144 mL of herbal extract prepared in step S1, the materials were uniformly stirred and subjected to ultrasonic treatment for 17 min, the mixture was placed in a vacuum mixing and homogenizing machine, 7 g of sodium CMC and 37 mL of glycerin were added to the vacuum mixing and homogenizing machine, the materials were mixed and stirred for 27 min, a vacuum pump of the mixing and homogenizing machine was turned on to start vacuuming, the materials were vacuum stirred for 45 min, paste was filled into a soft tube, and the soft tube was sealed by using a tube sealing machine, to obtain a silver compound preparation. In this step, addition of glycerin could maintain certain wettability and soft fluidity of the paste. In this step, sodium CMC was a water-soluble cellulose derivative, which could improve viscosity of the silver compound preparation and improve the texture. In this step, the small amount of lidocaine added was an amide local anesthetic, which achieved the anesthetic effect by blocking the generation and conduction of nerve impulses during use, to relieve or eliminate pain. In this step, the used herbal extract contained the roots of *S. oleracea* and the peel of *C. reticulata* that were rich in antioxidant ingredients. Introduction of the roots of *S. oleracea* and the peel of *C. reticulata* into the herbal extract was beneficial to preventing the silver compound preparation of the present application from being rapidly oxidized, and prolonging the duration of the medicinal effect on the skin.

In the present application, the nanocapsules containing the silver particles were prepared into an 8% suspension. The prepared solution was preserved in a refrigerator at 4° C. In an experiment, intragastric administration was adopted, and drugs that were at different concentrations and in equal volumes were administered to experimental subjects. In the present application, 30 5-7-week-old rats weighing 100-110 g were selected as the experimental subjects. A specific experimental method was as follows: (1) the 30 experimental rats were randomly divided into a control group and a treatment group for acute toxicity test. No drug was administered to the control group, and the 8% suspension of the nanocapsules containing the silver particles was administered to the treatment group. (2) The rats in the three groups were fasted for solids and liquids for 10 h. (3) The solution of the nanocapsules containing the silver particles was intragastrically administered to the rats in the treatment group. Negative ion water was given to the control group. The negative ion water was in the same volume as that of the drug for the treatment group. (4) The rats were observed, on the day of administration, the appearance and behavior and activities of the rats were observed, and breathing, secretions, defecation, and the like of the rats were recorded. All the rats were feed for 7 d, and weighed. In addition, the time of death and toxic reactions of the rats were recorded. (5) After the experiment was finished, pathological changes of organs and tissues of the rats were observed, and a maximum tolerated dose was calculated and recorded. During 7 consecutive days of observation, there is no abnormality in the appearance and behavior and activities of the rats, and meanwhile, there is no significant difference in water and food intake, breathing, secretions, and defecation from usual times. There is no death among the experimental rats. During continuous weighing, the body weight of the rat changes. Before administration, the body weight of the rats in control group ranges (98.02±0.89) g, and the body weight of the rats in the treatment group ranges (97.56±2.11) g. After 12 weeks of acute toxicity test, average body weight of the rats in the control group and the treatment group is (228.56±10.36) g and (229.73±12.1) g, respectively. There is no statistically significant difference. It can be seen that the nanocapsules containing the silver particles of the present application are safe. Based on a result of the dissection in the later stage of the experiment, it can be seen that after administration of the nanocapsules containing the silver particles of the present application, there is no significant change in organs, such as the heart, the liver, and the kidney, of the rats. Based on the above, it can be seen that the nanocapsules containing the silver particles of the present application are non-toxic and can be applied to a silver compound preparation.

Example 4

S1: a herbal extract was prepared by steam distillation extraction: 149 g of *P. oleracea*, 205 g of *P. micrantha* (Ledeb.) Spach, 59 g of peel of *A. sativum*, 59 g of roots of *S. oleracea*, and 29 g of peel of *C. reticulata* were weighed and ground, water was added to cover the materials, the mixer was pre-treated by using an ultrasonic machine for 19 min, 2.9 L of deionized water was added, the system was heated and maintained in a boiling state, 145 mL of cider vinegar was quickly added, and reflux condensation was performed to obtain a required herbal extract of the present application. In this step, ultrasonic treatment was adopted to break down cell walls of the herbs and dissolve out active ingredients. The addition of cider vinegar helped reflux condensation. In addition, a pH value of cider vinegar was close to that of the human skin, and thus cider vinegar was a natural ingredient for maintaining the pH value of the skin.

S2: 39 mL of 0.1 M CsOH was added to 277 mL of 1.9 mM $NH_2OH \cdot HCl$ solution, 55.9 mL of 11.9 mM $AgNO_3$ solution was added, 1.9 g of sodium dodecyl sulfate was added, the materials were uniformly stirred and subjected to ultrasonic treatment at 49° C. for 44 min, the solution was placed for 7 h and centrifuged at 8,000 rpm, to obtain spherical silver nanoparticles, the silver nanoparticles were uniformly mixed with 12 g of chitosan, the mixer was subjected to vacuum ball milling in a ball mill for 10 h and heated in an ultrafast high-temperature Joule heating furnace, the ball-milled powder containing the spherical silver nanoparticles was uniformly spread on conductive substrate graphite paper with a powder layer thickness of 1.0 mm, an initial current density was set to 280 $A/cm^2$, the heating rate was set to $10^6$ K/s, the target temperature was set to 590° C., the power was turned on, the temperature was instantly raised to the target temperature through Joule effect, the temperature was maintained for 40-60 s, high-pressure helium was taken as a cooling medium, after heat preservation was completed, the power was immediately turned off, and high-pressure helium was introduced for quenching, to obtain silver nanoparticles. In this step, $NH_2OH \cdot HCl$ was taken as a reductant, which could not only reduce silver ions into silver nanoparticles, but also play the role of a stabilizer to some extent, avoiding aggregation of particles. A reaction mechanism was as follows: $Ag^+ + NH_2OH \cdot HCl \rightarrow Ag$ (nanoparticles)$+N_2O+H_2O+HCl$. By virtue of the rapid temperature raising characteristics of the specially-made ultrafast high-temperature Joule heating furnace, pure silver nanoparticles were quickly prepared. In this step, the ball-milled silver nanoparticles had a large surface area-to-volume ratio, and thus had high reactivity. In this step, when dissolved in water, sodium dodecyl sulfate dissociated to produce negatively charged dodecyl sulfate ions ($C_{12}H_{25}SO^{4-}$), which reduced the surface tension of water and promoted the rapid aggregation of Ag ions to form nanoparticles.

S3: nanocapsules were prepared: 231 mL of glycerol, 16.2 g of gelatin particles, and 13 mL of glycol were weighed and uniformly mixed by ultrasonic stirring, 70 mL of deionized water, 1.5 g of polyethylene glycol 8000, 12.2 g of silver nanoparticles prepared in step S2, and 4 g of collagen were added, the materials were uniformly stirred and transferred into a three-neck flask, a stirrer was mounted, the mixture was stirred for 50 min, cider vinegar was added to adjust a pH value to 5.8, the solution reacted at 300 rpm for 5.4 h and was placed for precipitation, an upper solvent was removed, and precipitates were washed with distilled water or 75% medicinal alcohol and vacuum dried for 12 h, to obtain solid powder, namely, nanocapsules containing the silver particles. Advantages of preparation of a silver compound preparation from the nanocapsules containing the silver particles prepared in this step were as follows: silver was encapsulated in the nanocapsules, so that silver ions could be released slowly. Consequently, the duration of the antibacterial effect was prolonged, and the frequency of administration was reduced. Through the nanocapsules, silver could be precisely delivered to a body site to be treated or delivered into cells, to increase the local concentration and reduce systemic side effects. In addition to silver, the nanocapsules were loaded with collagen, which could maintain the skin firmness and elasticity, promoted wound healing, and helped repair damaged cartilage tissue.

S4: 11.8 g of nanocapsules containing the silver particles that were prepared in step S3 and 1.4 g of lidocaine were added to 133 mL of herbal extract prepared in step S1, the materials were uniformly stirred and subjected to ultrasonic treatment for 18 min, the mixture was placed in a vacuum mixing and homogenizing machine, 7 g of sodium CMC and 55 mL of glycerin were added to the vacuum mixing and homogenizing machine, the materials were mixed and stirred for 30 min, a vacuum pump of the mixing and homogenizing machine was turned on to start vacuuming, the materials were vacuum stirred for 45 min, paste was filled into a soft tube, and the soft tube was sealed by using a tube sealing machine, to obtain a silver compound preparation. In this step, addition of glycerin could maintain certain wettability and soft fluidity of the paste. In this step, sodium CMC was a water-soluble cellulose derivative, which could improve viscosity of the silver compound preparation and improve the texture. In this step, the small amount of lidocaine added was an amide local anesthetic, which achieved the anesthetic effect by blocking the generation and conduction of nerve impulses during use, to relieve or eliminate pain. In this step, the used herbal extract contained the roots of *S. oleracea* and the peel of *C. reticulata* that were rich in antioxidant ingredients. Introduction of the roots of *S. oleracea* and the peel of *C. reticulata* into the herbal extract was beneficial to preventing the silver compound preparation of the present application from being rapidly oxidized, and prolonging the duration of the medicinal effect on the skin.

Eczema, especially atopic dermatitis (AD), is not directly caused by a specific bacterial infection. However, impaired skin barrier function and abnormalities in the immune system make patients with eczema more susceptible to bacterial invasion, especially *Staphylococcus aureus*. Research has shown that *S. aureus* can be detected on the skin of 90% of patients with eczema, but is rarely detected in healthy people. *S. aureus* and toxins it produces can damage the skin barrier and trigger an inflammatory response, thereby exacerbating symptoms of eczema, such as itching, and redness and swelling. Although *S. aureus* is one of the most common fungi associated with eczema, other types of bacteria may also play a role in eczema, such as *Streptococcus*. In rare cases, group A β-hemolytic *Streptococcus* and the like can also cause or worsen symptoms of eczema. In the present application, *S. aureus* and *Streptococcus* are selected as test bacteria. A test was conducted with reference to Section 7.3 of QB/T2738-2012. Antibacterial rates of the silver compound preparations that were respectively subjected to 3-fold dilution and 90-fold dilution with deionized water were tested. The action time was 10 min, and the test was repeated 5 times.

Comparative Example 5: a difference between this example and Example 4 was as follows: nanocapsules containing silver particles were not added in step S4, and other steps were the same as those in Example 4.

TABLE 2

| Example 4 | *Streptococcus aureus* | *Staphylococcus* |
|---|---|---|
| Antibacterial rate (%) of 3-fold dilution | >99 | >99 |
| Antibacterial rate (%) of 90-fold dilution | 95 | 82 |

TABLE 3

| Comparative Example 5 | *Staphylococcus aureus* | *Streptococcus* |
|---|---|---|
| Antibacterial rate (%) of 3-fold dilution | 90 | 68 |
| Antibacterial rate (%) of 90-fold dilution | 58 | 33 |

Table 2 and Table 3 show experimental results of *S. aureus* and *Streptococcus* resist effects of the compound preparations of Example 4 and Comparative Example 5 that are subjected to 3-fold dilution and 90-fold dilution, which indicate that the antibacterial effect of the compound preparation that is prepared from the nanocapsules containing the silver particles of the present application is better. silver is encapsulated in the nanocapsules, so that silver ions can be released slowly. Consequently, the duration of the antibacterial effect is prolonged, and the frequency of administration is reduced. Through the nanocapsules, silver could be precisely delivered to a body site to be treated or delivered into cells, to increase the local concentration and reduce systemic side effects. In addition to silver, the nanocapsules were loaded with collagen, which could maintain the skin firmness and elasticity, promoted wound healing, and helped repair damaged cartilage tissue. Based on the above, it can be seen that the silver compound preparation of the present application can be applied to treatment of cutaneous fungal infections and eczema.

The foregoing embodiments are merely specific implementations of the present application. The description thereof is relatively specific and detailed, but it should not be understood as limiting the scope of protection of the present application. It should be pointed out that for those of ordinary skill in the art, without departing from the concept of the present application, any other changes, modifications, substitutions, combinations, and simplifications made without departing from the spirit and principles of the present application should be equivalent replacements and fall within the scope of protection of the present application.

What is claimed is:

1. A silver compound preparation, wherein preparation of the silver compound preparation comprises the following steps:
S1: preparing an herbal extract by steam distillation extraction: weighing 143-198 g of *Portulaca oleracea*, 189-232 g of *Plumbagella micrantha* (Ledeb.) Spach, 53-66 g of peel of *Allium sativum*, 50-66 g of roots of *Spinacia oleracea*, and 28-35 g of peel of *Citrus reticulata*, grinding, adding water to cover the materials, pre-treating ultrasonically for 15-20 min, adding 2-4 L of deionized water, heating and maintaining a resulting mixture in a boiling state, adding 130-150 mL of cider vinegar, and performing reflux condensation to obtain the herbal extract;
S2: adding 33-55 mL of 0.1 M CsOH to 265-286 mL of 1.5-3.2 mM hydroxylammonium chloride ($NH_2OH \cdot HCl$) solution, adding 55.5-76.8 mL of 11-13 mM $AgNO_3$ solution, adding 1.5-2.8 g of sodium dodecyl sulfate, uniformly stirring, performing ultrasonic treatment at 42-54° C. for 33-55 min, placing a resulting mixture for 5-8 h, and then centrifuging at 8,000 rpm, to obtain spherical silver nanoparticles, uniformly mixing the spherical silver nanoparticles with 11-13 g of chitosan, performing vacuum ball milling in a ball mill for 8-11 h, heating in an ultrafast high-temperature Joule heating furnace, uniformly spreading the ball-milled powder containing the spherical silver nanoparticles on conductive substrate graphite paper with a powder layer thickness of 0.8-1.2 mm, setting an initial current density to 200-300 $A/cm^2$, setting a heating rate to $10^6$ K/s, setting a target temperature to 550-630° C., turning on the power, raising the temperature to the target temperature through Joule effect, maintaining the temperature for 40-60 s, taking helium as a cooling medium, after heat preservation is completed, turning off the power, and introducing the helium for quenching, to obtain silver nanoparticles;
S3: preparing nanocapsules: weighing 225-235 mL of glycerol, 13.5-17.2 g of gelatin particles, and 12-15 mL of glycol, uniformly mixing by ultrasonic stirring, adding 65-72 mL of deionized water, 1.2-1.6 g of polyethylene glycol 8000, 11.8-13.2 g of the silver nanoparticles prepared in step S2, and 3-5 g of collagen, uniformly stirring, transferring into a three-neck flask, mounting a stirrer, stirring for 50 min, adding cider vinegar to adjust a pH value to 5-6, reacting at 300-400 rpm for 5-6 h, placing for precipitation, removing a remaining solvent after precipitation, washing with distilled water or 75% medicinal alcohol, and vacuum drying for 12 h, to obtain solid powder having the nanocapsules containing the silver nanoparticles; and
S4: adding 10.6-13.8 g of the nanocapsules containing the silver nanoparticles that are prepared in step S3 and 1.2-1.5 g of lidocaine to 120-150 mL of the herbal extract prepared in step S1, uniformly stirring, performing ultrasonic treatment for 15-20 min, placing in a vacuum mixing and homogenizing machine, adding 6-8 g of sodium carboxymethylcellulose (CMC) and 35-60 mL of glycerin to the vacuum mixing and homogenizing machine, mixing and stirring for 20-40 min, turning on a vacuum pump of the mixing and homogenizing machine to start vacuuming, vacuum stirring for 45 min, filling a resulting mixture into a tube, and sealing by using a tube sealing machine, to complete the silver compound preparation.

2. The silver compound preparation according to claim 1, wherein in step S1, the herbal extract is prepared by steam distillation extraction: 143 g of *P. oleracea*, 189 g of *P. micrantha* (Ledeb.) Spach, 53 g of peel of *A. sativum*, 50 g of roots of *S. oleracea*, and 28 g of peel of *C. reticulata* are weighed and ground, water is added to cover the materials, and pre-treated ultrasonically for 15 min, 2 L of deionized water is added, the resulting mixture is heated and maintained in the boiling state, 130 mL of cider vinegar is added, and reflux condensation is performed to obtain the herbal extract.

3. The silver compound preparation according to claim 1, wherein in step S1, the herbal extract is prepared by steam distillation extraction: 198 g of *P. oleracea*, 232 g of *P. micrantha* (Ledeb.) Spach, 66 g of peel of *A. sativum*, 66 g of roots of *S. oleracea*, and 35 g of peel of *C. reticulata* are weighed and ground, water is added to cover the materials, and pre-treated ultrasonically for 20 min, 4 L of deionized water is added, the resulting mixture is heated and maintained in the boiling state, 150 mL of cider vinegar is added, and reflux condensation is performed to obtain the herbal extract.

4. The silver compound preparation according to claim 3, wherein in step S2, 33 mL of 0.1 M CsOH is added to 265 mL of 1.5 mM $NH_2OH \cdot HCl$ solution, 55.5 mL of 13 mM $AgNO_3$ solution is added, 1.5 g of sodium dodecyl sulfate is added, the materials are uniformly stirred and subjected to ultrasonic treatment at 42° C. for 33 min, the resulting solution is placed for 5 h and then centrifuged at 8,000 rpm, to obtain the spherical silver nanoparticles, the spherical silver nanoparticles are uniformly mixed with 11 g of chitosan, the resulting mixture is subjected to vacuum ball milling in the ball mill for 8 h and heated in the ultrafast high-temperature Joule heating furnace, the ball-milled powder containing the spherical silver nanoparticles is uniformly spread on the conductive substrate graphite paper with the powder layer thickness of 0.8 mm, the initial current density is set to 200 $A/cm^2$, the heating rate is set to $10^6$ K/s, the target temperature is set to 550° C., the power is turned on, the temperature is raised to the target temperature through Joule effect, the temperature is maintained for 40 s, helium is taken as the cooling medium, after heat preservation is completed, the power is turned off, and the helium is introduced for quenching, to obtain the silver nanoparticles.

5. The silver compound preparation according to claim 3, wherein in step S2, 55 mL of 0.1 M CsOH is added to 286 mL of 3.2 mM $NH_2OH \cdot HCl$ solution, 76.8 mL of 11-13 mM $AgNO_3$ solution is added, 2.8 g of sodium dodecyl sulfate is added, the materials are uniformly stirred and subjected to ultrasonic treatment at 54° C. for 55 min, the resulting solution is placed for 8 h and centrifuged at 8,000 rpm, to obtain the spherical silver nanoparticles, the spherical silver nanoparticles are uniformly mixed with 13 g of chitosan, vacuum ball milling in the ball mill for 11 h and heated in the ultrafast high-temperature Joule heating furnace, the ball-milled powder containing the spherical silver nanoparticles is uniformly spread on the conductive substrate graphite paper with the powder layer thickness of 1.2 mm, the initial current density is set to 300 A/cm$^2$, the heating rate is set to $10^6$ K/s, the target temperature is set to 630° C., the power is turned on, the temperature is raised to the target temperature through Joule effect, the temperature is maintained for 60 s, helium is taken as the cooling medium, after heat preservation is completed, the power is turned off, and the helium is introduced for quenching, to obtain the silver nanoparticles.

6. The silver compound preparation according to claim 5, wherein in step S3, 225 mL of glycerol, 13.5 g of gelatin particles, and 12 mL of glycol are weighed and uniformly mixed by ultrasonic stirring, 65 mL of deionized water, 1.2 g of polyethylene glycol 8000, 11.8 g of the silver nanoparticles prepared in step S2, and 3 g of collagen are added, the materials are uniformly stirred and transferred into the three-neck flask, the stirrer is mounted, the mixture is stirred for 50 min, cider vinegar is added to adjust the pH value to 5, the resulting solution reacts at 300 rpm for 5 h and is placed for precipitation, a remaining solvent is removed, and the precipitates are washed with distilled water or 75% medicinal alcohol and vacuum dried for 12 h, to obtain the solid powder having the nanocapsules containing the silver nanoparticles.

7. The silver compound preparation according to claim 5, wherein in step S3, 235 mL of glycerol, 17.2 g of gelatin particles, and 15 mL of glycol are weighed and uniformly mixed by ultrasonic stirring, 72 mL of deionized water, 1.6 g of polyethylene glycol 8000, 13.2 g of the silver nanoparticles prepared in step S2, and 5 g of collagen are added, the materials are uniformly stirred and transferred into the three-neck flask, the stirrer is mounted, the mixture is stirred for 50 min, cider vinegar is added to adjust the pH value to 6, the resulting solution reacts at 400 rpm for 6 h and is placed for precipitation, a remaining solvent is removed, and the precipitates are washed with distilled water or 75% medicinal alcohol and vacuum dried for 12 h, to obtain the solid powder having the nanocapsules containing the silver nanoparticles.

8. The silver compound preparation according to claim 7, wherein in step S4, 13.8 g of the nanocapsules containing the silver nanoparticles that are prepared in step S3 and 1.5 g of lidocaine are added to 150 mL of the herbal extract prepared in step S1, the ultrasonic treatment is executed for 20 min, 8 g of sodium CMC and 60 mL of glycerin are added to the vacuum mixing and homogenizing machine, the resulting mixture is mixed and stirred for 40 min, and then vacuum stirred for 45 min, filled into the tube, and the tube is sealed by using the tube sealing machine, to complete the silver compound preparation.

\* \* \* \* \*